United States Patent [19]
Berntell

[11] 4,395,879
[45] Aug. 2, 1983

[54] HOT GAS ENGINE HEATER HEAD

[75] Inventor: John O. Berntell, Staffanstorp, Sweden

[73] Assignee: Kommanditbolaget United Stirling AB & Co., Sweden

[21] Appl. No.: 303,602

[22] Filed: Sep. 18, 1981

[51] Int. Cl.³ ................................. F24J 3/00
[52] U.S. Cl. ....................... 60/517; 60/525; 126/442; 165/51; 165/176
[58] Field of Search .................. 60/517, 524, 525; 126/442, 450, 451; 165/51, 176

[56] References Cited

U.S. PATENT DOCUMENTS

| 3,965,976 | 6/1976 | Barton | 60/517 X |
| 4,069,670 | 1/1978 | Bratt et al. | 60/517 |
| 4,345,645 | 8/1982 | Bratt | 60/517 X |

Primary Examiner—Sheldon J. Richter
Attorney, Agent, or Firm—Finnegan, Henderson, Farabow, Garrett & Dunner

[57] ABSTRACT

A heater head for a multi-cylinder solar radiation powered hot gas engine comprises tubes connecting cylinder and regenerator tops. Each tube comprises three parts. A first part of each tube extends along an involute curve on a cone. A second part extends radially outwardly on the same cone while a third part extends radially inwardly and downwardly on another cone.

2 Claims, 2 Drawing Figures

HOT GAS ENGINE HEATER HEAD

PRIOR ART REFERENCES

U.S. Pat. No. 4,069,670
U.S. Patent applicaton Ser. No. 199,007

BACKGROUND OF THE INVENTION

1. Field of the Invention

This invention relates to a multiple cylinder hot gas engine heater head in which a plurality of tubes connect the cylinders with the corresponding regenerator housings and in which each tube has a first curved part of a shape which corresponds substantially to the shape of an involute curve on a cone, and in which tubes are juxtaposed so that constant, small gaps between the curved parts are obtained.

2. Description of the Prior Art

The prior art is elucidated best e.g. in U.S. Pat. No. 4,345,645. In this prior art the first curved parts of the tubes connect a quarter circle segment manifold of a cylinder with two circle segment regenerator manifolds arranged at a larger distance from a central axis via second curved tube parts following involute curves on the same cone but at such larger base circle that a multiple of tubes may be arranged.

The said known type of heater head is adapted to be heated by solar radiation, but although the greater parts of the tubes may be exposed to the sun, it still comprises tube parts which are shadowed and thus increases the dead volumes of the engine.

SUMMARY OF THE INVENTION

The object of the present invention is to provide a heater head of the type referred to above in which nearly all tube parts may be exposed to direct solar radiation. According to the present invention this is obtained thereby that each tube has a second, radially directed straight tube part starting in continuation of the said first curved part and located on said cone, said second parts leaving betweem them gaps exceeding the tube diameter, each tube also comprising a third, radially directed straight tube part starting in continuation of said second part and extending so as to be visible in the direction of the cone axis between said second tube parts.

The invention will be described in more detail reference being made to the accompanying drawings.

DETAILED DESCRIPTION OF THE DRAWINGS

Figure 1:
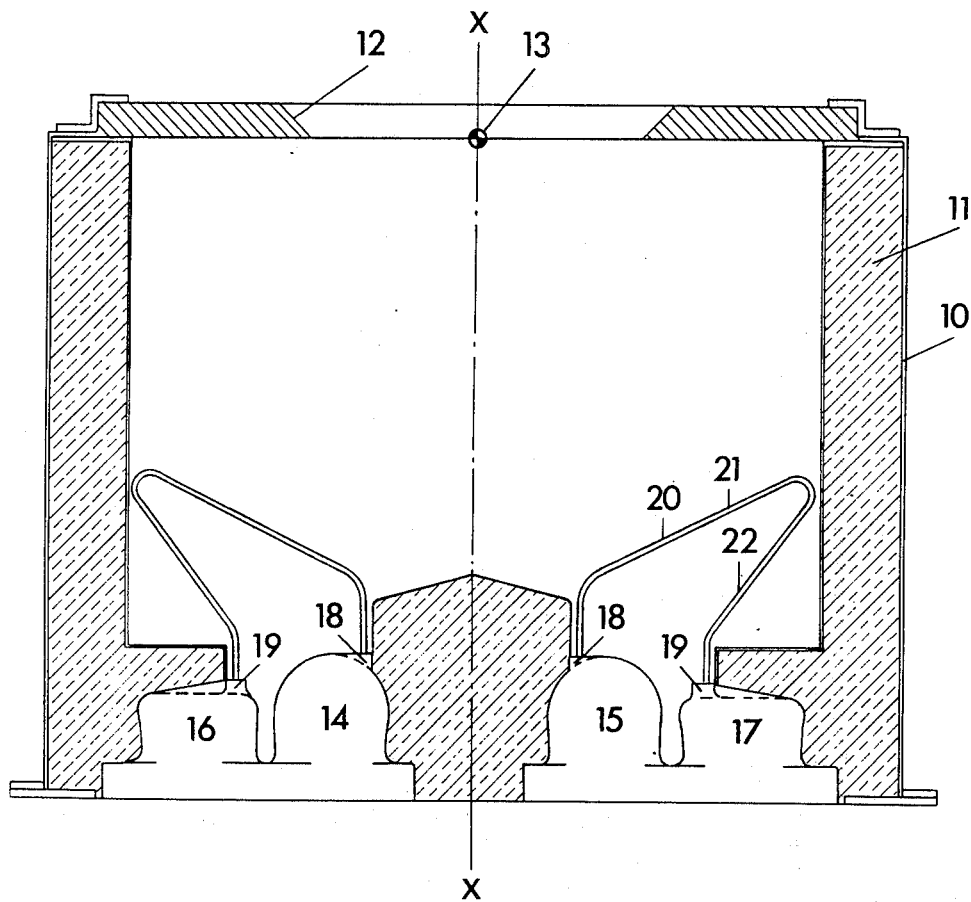
FIG. 1 shows a vertical section through a solar energy receiver together with a heater head according to the invention.

The solar energy receiver shown in FIG. 1 comprises a double walled housing 10 filled with insulating material 11. An iris opening 12 allows solar radiation to enter into the housing 10 and is concentrated by one or more mirrors (not shown) having a focus indicated by 13.

At the end of the housing 10 remote from the opening 12 cylinder tops 14, 15 and regenerator tops 16, 17 of a hot gas engine (not otherwise shown) are located. Manifolds 18 at the cylinder tops 14, 15 are connected to manifolds 19 at the regenerator tops 16, 17 by tubes each of which comprise parts 20, 21 and 22. Said parts are shown more clearly in FIG. 2.

Figure 2:
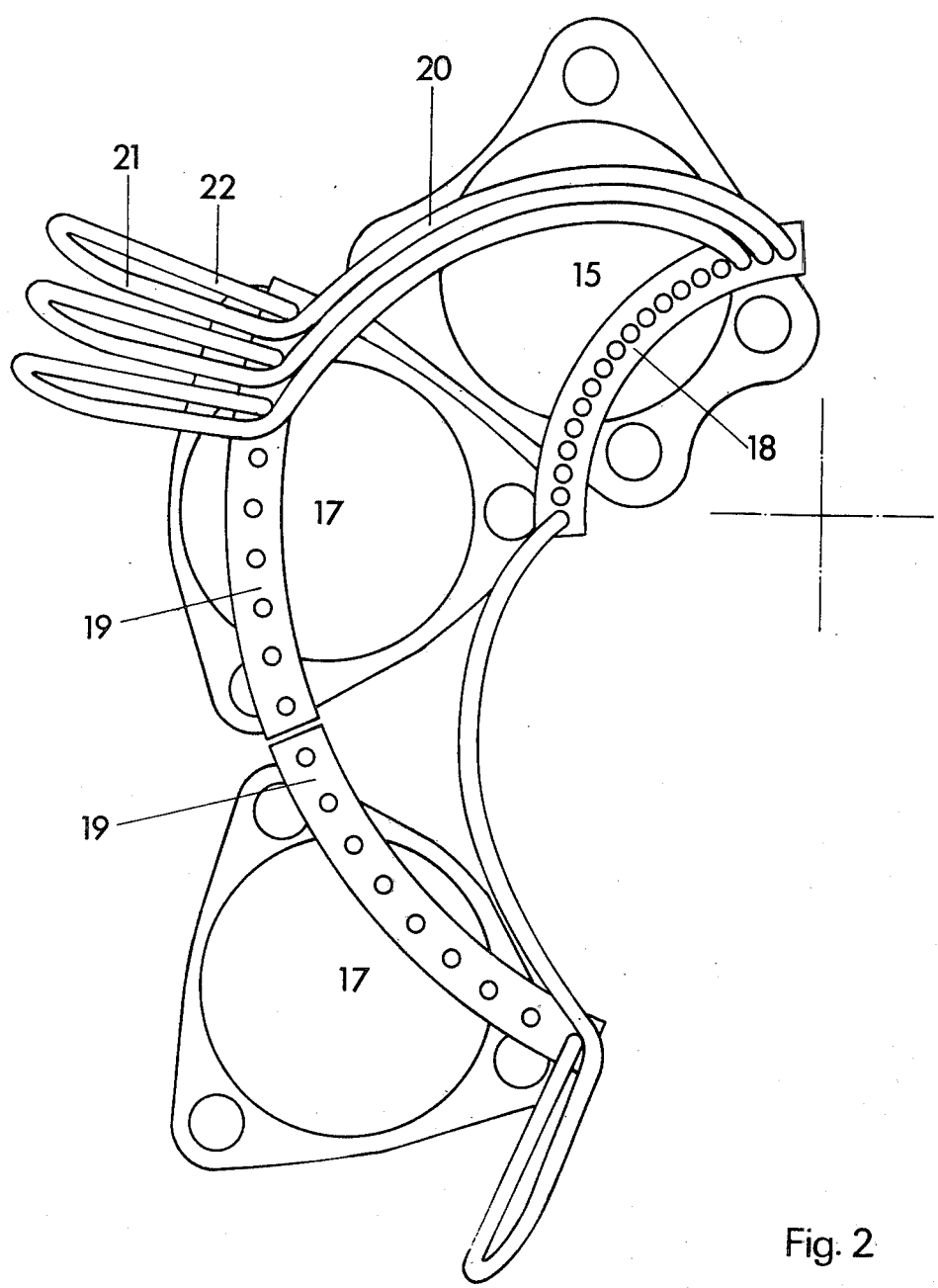
FIG. 2 shows parts of a quadrant of the heater head of FIG. 1 viewed from above.

As shown in FIG. 2 one cylinder top 15 is connected to two regenerator tops 17 the number of regenerators being twice the number of cylinders in the embodiment shown. The part 20 of each tube follows an involute curve on a cone, whereas the part 21 extends radially outwardly on the same cone. The parts 20 of two adjacent tubes are located with very small gaps between them. The part 22 of each tube extends radially inwardly and downwardly on another cone coaxially with the cone followed by the parts 20 and 21, but having a smaller cone angle.

The tube part 21 is bent off from the part 20 at such radial distance from the cone axis X—X that the gaps formed between adjacent parts 21 are greater than the tube diameter. Thus it is possible to make the tube parts 22 axially visible.

It will be understood that the heater head design according to the invention will comprise heater tubes which may be exposed to heat radiation almost along their total length. It will also be understood that the heater head will form a comparatively large heat absorbing surface in the solar heat receiver.

I claim:

1. A multiple cylinder hot gas engine heater head in which a plurality of tubes connect the cylinders with the corresponding regenerator housings and in which each tube has a first curved part of a shape which corresponds substantially to the shape of an involute curve on a cone, and in which the tubes are juxtaposed so that constant, small gaps between the curved parts are obtained, characterized in that each tube has a second, radially directed straight tube part starting in continuation of the said first curved part and located on said cone, said second parts leaving between them gaps exceeding the tube diameter, each tube also comprising a third, radially directed straight tube part starting in continuation of said second part and extending so as to be visible in the direction of the cone axis between said second tube parts.

2. A heater head according to claim 1 characterized in that said third tube parts are following a second cone coaxial with but having a smaller cone angle than the said cone of the first and second tube parts.

* * * * *